Figure 1:
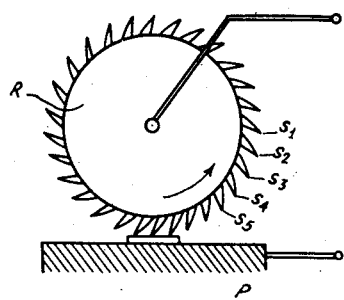

Aug. 30, 1932.  W. LUDENIA ET AL  1,875,063
NARROW TAPE RECORDER FOR HIGH SPEED TELEGRAPHY
Filed June 5, 1930

INVENTORS
WERNER LUDENIA and FRITZ SCHROETER
BY
ATTORNEY

Patented Aug. 30, 1932

1,875,063

UNITED STATES PATENT OFFICE

WERNER LUDENIA AND FRITZ SCHROETER, OF BERLIN, GERMANY, ASSIGNORS TO TELEFUNKEN GESELLSCHAFT FUR DRAHTLOSE TELEGRAPHIE M. B. H., OF BERLIN, GERMANY, A CORPORATION OF GERMANY

NARROW-TAPE RECORDER FOR HIGH SPEED TELEGRAPHY

Application filed June 5, 1930, Serial No. 459,306, and in Germany June 5, 1929.

This invention is concerned with high speed telegraphy apparatus and is more particularly drawn to means for recording high speed signals preferably in readable letters upon narrow tapes.

There are two kinds of high speed telegraphy receiver apparatus known in the art which are used to any appreciable extent; one of these is the mechanically operating type printers; and the other, the so-called electrolytic printers. The latter are seldom employed in practice. These instruments used for recording the signals are more or less constructed and operated in the following manner:

A number of pins are fed with current by a corresponding number of leads or conductors and they thus produce marks or impressions as they are drawn along a sensitized paper. These marks result in letters analogous to the letters or symbols which were transmitted at the transmitter. This invention will be better understood from the following detailed discussion when read in connection with the drawing, in which, Figure 1 illustrates one embodiment of the invention; and, Figure 2 illustrates diagrammatically another embodiment which is admirably adapted to dimension fading effects.

According to the basic idea of this invention the recording pins are disposed upon the periphery of a revolving wheel R in Figure 1 whose circumference or contour is large compared with the writing surface. This is preferably so constructed in order that a relatively flat surface may be presented between the tape and the wheel. In case the wheel R is run in synchronism with the scanning element of the transmitter then the letters transmitted are produced under the ends of the wheel and these letters are directly legible. It will be seen that this scheme offers the advantage that only a single line is needed or in case of radio transmission a single wave.

In Figure 1, S1, S2, etc., represents the pins and P the tape which is run at right angles to the wheel. It will be noted in Figure 1 that the tape is narrow in comparison with the diameter of the wheel R. The incoming energy may be applied at the terminals $a$, $b$ in well known manner.

Figure 2:
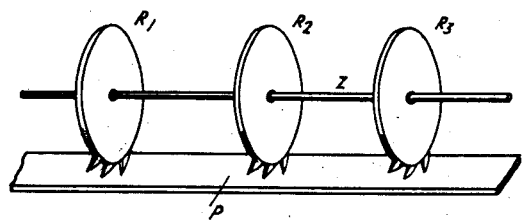

In order to diminish fading effects which occur in wireless telegraphy it may be advantageous to provide several wheels R1 to R3, Figure 2 upon a spindle Z. The arrangement in Figure 2 is such that the pins in the different wheels are so staggered or displaced relative to one another that they will alternately work over the three wheels in any desired sequence so that should fading affect any portion of a signal it can readily be seen that only a relatively small part of the tape in any given vicinity would be affected. It is to be distinctly understood that while we have shown a particular construction of the device many other methods and means of constructing the wheel which will come within the scope of this invention will be obvious to anyone skilled in the art, and, therefore, we do not desire to limit ourselves to the particular embodiments shown.

We claim:

1. A recorder for high speed telegraphy including, a rotatable wheel, a recorder tape comprising a narrow band on which signal markings are impressed, the width of said tape being small compared to the diameter of said wheel, a plurality of contact points disposed on the periphery of said wheel, and means for causing said tape to follow a path parallel to the axis of said wheel and adjacent the periphery thereof whereby the feelers on the periphery of said wheel contact with said tape.

2. A tape recorder for a high speed telegraphy including a plurality of rotatable wheels arranged in spaced relation on a shaft, a recorder tape, said tape being located adjacent the peripheries of said wheels, the diameter of said wheels being large as compared to the width of said tape, and a plurality of feeler members disposed on the peripheries of each of said wheels.

3. A recorder, as recited in claim 2, in which the feeler members are located in staggered relation on the several wheels.

4. A recorder, as recited in claim 2, in which the feeler members are located in staggered relation on the several wheels and in which the tape is in the form of a narrow band and is caused to be moved at right angles to the planes of the wheels and adjacent the periphery thereof.

WERNER LUDENIA.
FRITZ SCHROETER.